(12) United States Patent
Suto et al.

(10) Patent No.: US 10,477,058 B2
(45) Date of Patent: Nov. 12, 2019

(54) IMAGE READING DEVICE AND IMAGE FORMING APPARATUS INCLUDING THE SAME

(71) Applicant: SHARP KABUSHIKI KAISHA, Sakai, Osaka (JP)

(72) Inventors: Yasuhiro Suto, Sakai (JP); Kenji Nakanishi, Sakai (JP); Hisashi Yamanaka, Sakai (JP); Shohichi Fukutome, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/218,189

(22) Filed: Dec. 12, 2018

(65) Prior Publication Data

US 2019/0208074 A1 Jul. 4, 2019

(30) Foreign Application Priority Data

Dec. 28, 2017 (JP) ................................. 2017-253607

(51) Int. Cl.
*H04N 1/028* (2006.01)
*G02B 7/182* (2006.01)
*G02B 17/06* (2006.01)
*G02B 26/10* (2006.01)

(52) U.S. Cl.
CPC ........... *H04N 1/0283* (2013.01); *G02B 7/182* (2013.01); *G02B 17/06* (2013.01); *H04N 1/0285* (2013.01); *G02B 26/10* (2013.01)

(58) Field of Classification Search
None
See application file for complete search history.

(56) References Cited

U.S. PATENT DOCUMENTS

| 2014/0226191 A1* | 8/2014 | Enomoto | H04N 1/00588 358/496 |
| 2015/0055195 A1* | 2/2015 | Suto | H04N 1/02815 358/475 |
| 2015/0365556 A1* | 12/2015 | Imoto | H04N 1/02895 358/475 |
| 2018/0262638 A1* | 9/2018 | Ohzawa | H04N 1/0305 |

FOREIGN PATENT DOCUMENTS

| JP | 05030293 A | * | 2/1993 |
| JP | H05-30293 A | | 2/1993 |
| JP | 07056242 A | * | 3/1995 |
| JP | H07-56242 A | | 3/1995 |

* cited by examiner

*Primary Examiner* — Ted W Barnes
(74) *Attorney, Agent, or Firm* — ScienBiziP, P.C.

(57) ABSTRACT

An image reading device includes an image reader that scans a document so as to read an image of the document. The image reader includes a scanning body in which at least plural mirrors, a condenser lens, and an image sensor are disposed. In the scanning body, concerning positional relationships among the plural mirrors as viewed from a main scanning direction, the plural mirrors are disposed on two sides with respect to an imaginary line extending along an optical axis of reflected light from the document. The mirrors on a corresponding one of the two sides are disposed such that a reflecting position of a mirror on a downstream side in a traveling direction of the reflected light is positioned closer to the document and also to the imaginary line than that of a mirror on an upstream side in the traveling direction of the reflected light.

7 Claims, 5 Drawing Sheets

IMAGE READING DEVICE AND IMAGE FORMING APPARATUS INCLUDING THE SAME

BACKGROUND

1. Field

The present disclosure relates to an image reading device and an image forming apparatus, such as a copying machine, a multifunction device, and a fax machine, including the image reading device.

2. Description of the Related Art

An image reading device including the following type of image reader is known (see Japanese Unexamined Patent Application Publication Nos. H5-30293 and H7-56242, for example). The image reader scans a document so as to read an image of the document by using an image sensor via plural mirrors and a condenser lens.

In the image readers of the image reading devices disclosed in the above-described publications, light reflected by a document is reflected multiple times by using one mirror. This configuration disturbs the balance of the arrangement of plural mirrors. This also varies the optical path lengths among the mirrors, thereby failing to arrange the plural mirrors in a well-balanced manner. The size of the image readers is thus increased, which also makes the image reading devices larger.

It is thus desirable to arrange plural mirrors in a well-balanced manner so as to reduce the size of an image reader and also the sizes of an image reading device and an image forming apparatus including the image reading device.

SUMMARY

According to an aspect of the disclosure, there is provided an image reading device including an image reader that scans a document so as to read an image of the document. The image reader includes a scanning body in which at least a plurality of mirrors, a condenser lens, and an image sensor are disposed. In the scanning body, concerning positional relationships among the plurality of mirrors as viewed from a main scanning direction, the plurality of mirrors are disposed on two sides with respect to an imaginary line extending along an optical axis of reflected light from the document. A plurality of the mirrors on a corresponding one of the two sides are disposed such that a reflecting position of a mirror on a downstream side in a traveling direction of the reflected light is positioned closer to the document and also to the imaginary line than a reflecting position of a mirror on an upstream side in the traveling direction of the reflected light. According to another aspect of the disclosure, there is provided an image forming apparatus including the above-described image reading device.

DESCRIPTION OF THE EMBODIMENTS

Figure 1:
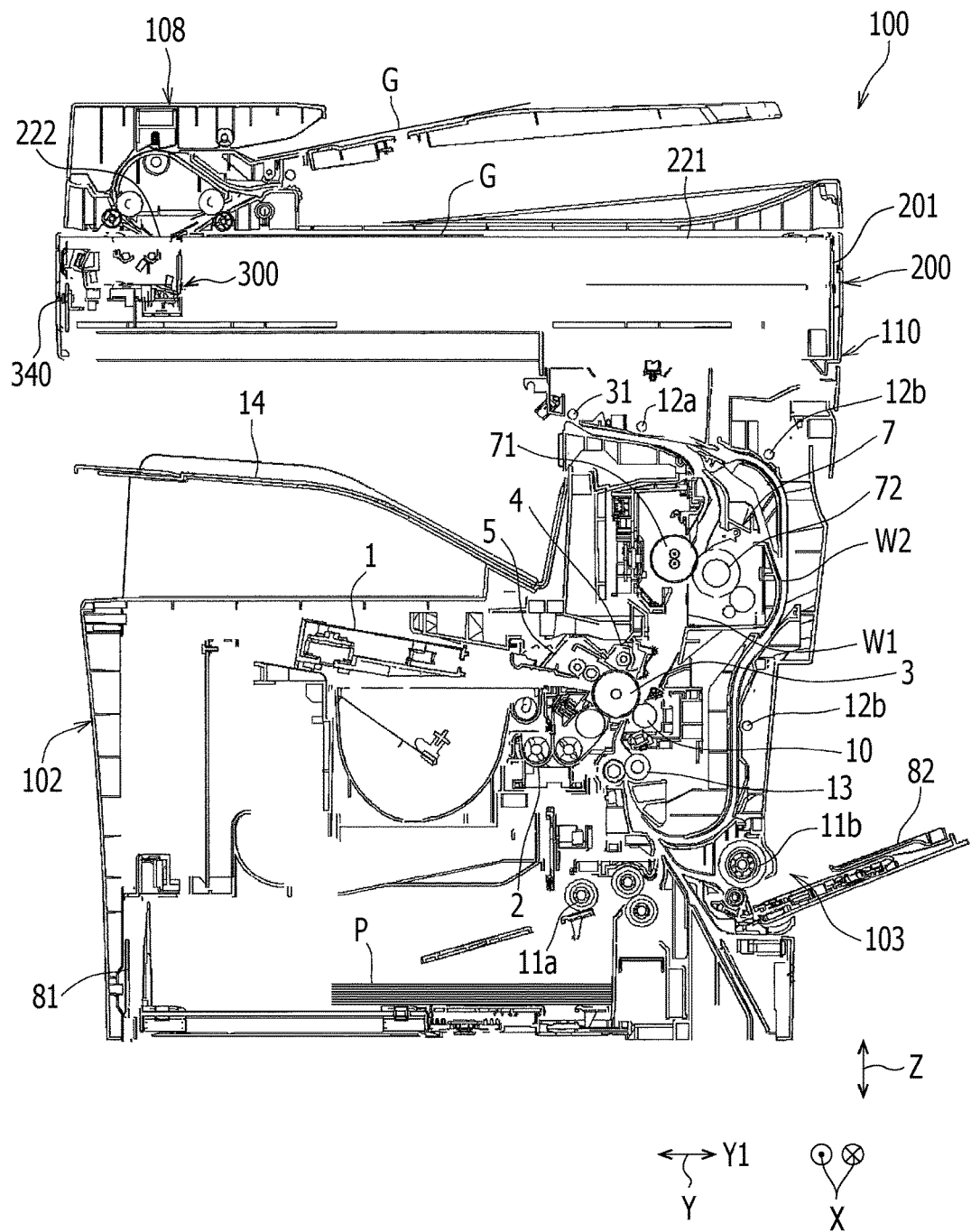
FIG. 1 is a schematic front sectional view of an image forming apparatus including an image reading device according to an embodiment of the disclosure.

An embodiment of the disclosure will be described below with reference to the accompanying drawings. In the following description, components having the same name and the same function are designated by like reference numerals, and thus, a detailed explanation thereof will not be repeated.

[Image Forming Apparatus]

FIG. 1 is a schematic front sectional view of an image forming apparatus 100 including an image reading device 200 according to an embodiment of the present disclosure. In FIG. 1, the symbols X indicate the main scanning direction. The double-headed arrow Y indicates the sub-scanning direction perpendicular to toe main scanning direction X, and the arrow Y1 indicates the direction in which a document G is read (also be simply called the image reading direction Y1). The double-headed arrow Z indicates the top-bottom direction and the vertical direction. The image forming apparatus 100 according to the present embodiment is a monochrome image forming apparatus. The image forming apparatus 100 performs image forming processing in accordance with image data read by the image reading device 200 or image data transferred from an external source. The image forming apparatus 100 may alternatively be a color image forming apparatus that forms a multicolor or single-color image on a sheet P.

The image forming apparatus 100 includes a document feeder 108 and a body 110 of the image forming apparatus 100. The body 110 includes an image forming system 102 and a sheet transport system 103.

The image forming system 102 includes an exposure unit 1, a developing unit 2, a photoconductor drum 3 which serves as an electrostatic latent image carrier, a cleaning unit 4, a charger 5, and a fixing unit 7. The sheet transport system 103 includes a sheet feeder tray 81, a manual sheet feeder tray 82, a discharge roller 31, and a discharge tray 14.

The image reading device 200 for reading an image of the document G is provided on the top of the body 110. The image reading device 200 includes a document table 221 more specifically, document glass) on which the document G is placed and a document reading plate 222 (more specifically, document reading glass). The document feeder 108 is provided above the document table 221 and the document reading plate 222. In the image forming apparatus 100, the image of the document G read by the image reading device 200 is supplied to the body 110 as image data and is recorded on a sheet P.

A sheet transport path W1 is provided in the body 110. The sheet feeder tray 81 or the manual sheet feeder tray 82 feeds a sheet P to the sheet transport path W1. The sheet transport path W1 guides the sheet P to the discharge tray 14 via a transfer roller 10 and the fixing unit 7. The fixing unit 7 heats a toner image formed on the sheet P and fixes it on the sheet P. In the vicinity of the sheet transport path W1, pickup rollers 11a and 11b, a transport roller 12a, a registration roller 13, the transfer roller 10, a heat roller 71 and a pressure roller 72 in the fixing unit 7, and the discharge roller 31 are disposed.

In the image forming apparatus 100, the sheet P fed by the sheet feeder tray 81 or the manual sheet feeder tray 82 is transported to the registration roller 13. Then, the sheet P is transported to the transfer roller 10 by the registration roller 13 at a timing at which the sheet P will face the toner image formed on the photoconductor drum 3. The toner image is then transferred to the sheet P by the transfer roller 10. Thereafter, the sheet P passes between the heat roller 71 and the pressure roller 72 of the fixing unit 7 and is discharged to the discharge tray 14 via the transport roller 12a and the discharge roller 31. If an image is formed on the back side of the sheet P as well as on the front side, the sheet P is transported back to a reverse sheet transport path W2 from the discharge roller 31 in the reverse direction. After the sheet P is turned over from the front side to the back side via reverse transport rollers 12b, it is supplied again to the registration roller 13. A toner image is transferred to the back side of the sheet. P and is fixed on the sheet P, as in the front side, and then, the sheet P is discharged to the discharge tray 14.

[Image Reading Device]

The image reading device 200 includes an image reader 300 (more specifically, an image reading unit) that scans a document G so as to read the image of the document G. The image reading device 200 scans the document P placed on the document table 221 while moving the image reader 300 alone the bottom surface of the document table 221 in the image reading direction Y1 of the scanning direction Y. In this manner, the image reading device 200 reads the image of the document G placed on the document table 221 by using a reduction-type image sensor 340 (an example of an image sensor). Additionally, the image reading device 200 stops the image reader 300 at a position under the document reading plate 222 and causes the image reader 300 to scan a document G transported by the document feeder 108 and passing on the document reading plate 222. In this manner, by using the reduction-type image sensor 340, the image reading device 200 reads the image of the document G transported by the image feeder 108.

The image reader 300 is provided to be reciprocatable under the document table 221 and the document reading plate 222 within a housing 201 of the image reading device 200 in the sub-scanning direction Y. The image reader 300 is driven by a driver, which is not shown.

[Image Reader]

Figure 2:
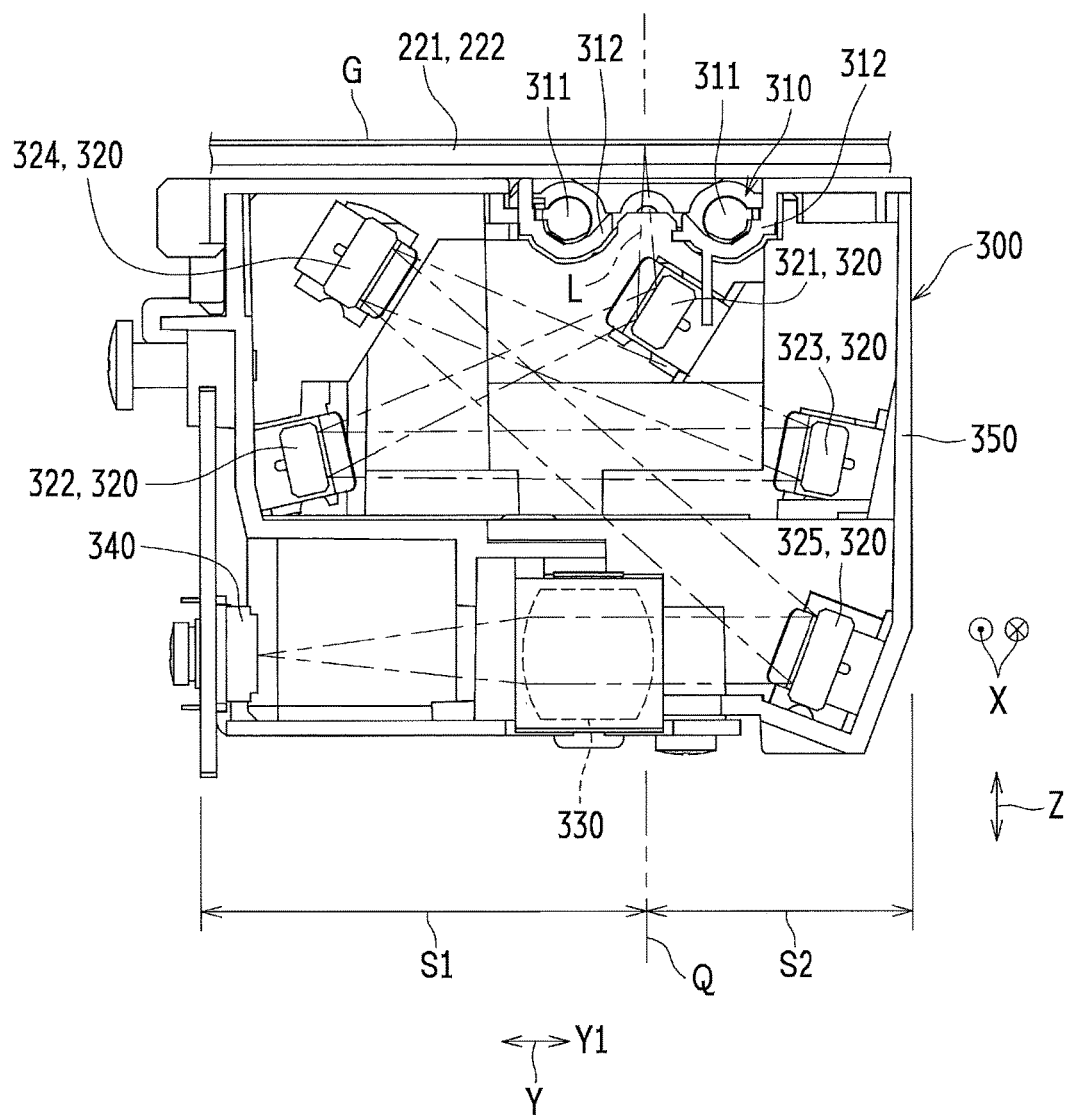
FIG. 2 is a schematic front sectional view of an image reader included in the image reading device.
Figure 3:
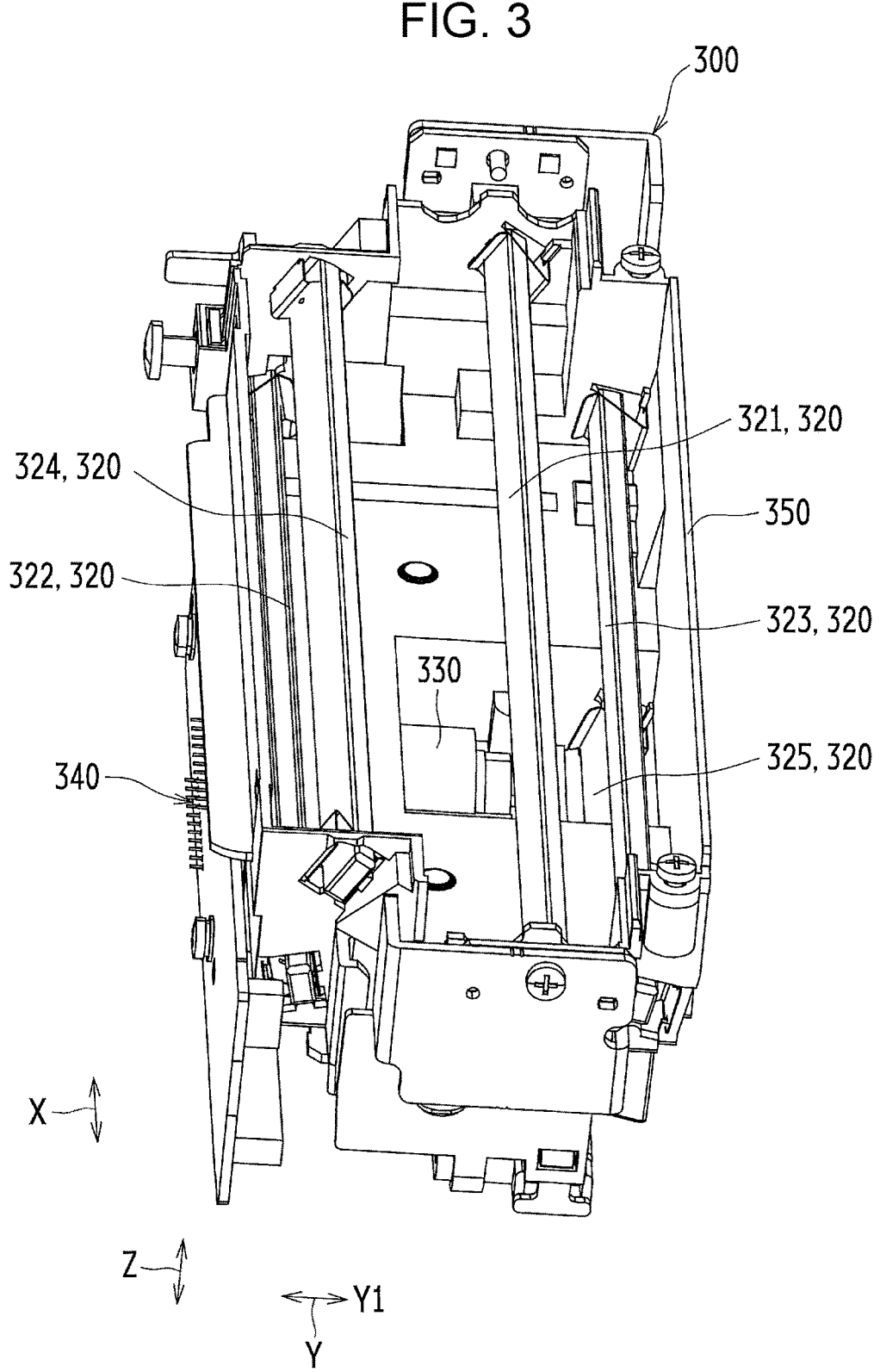
FIG. 3 is a front perspective view of the image reader without a light source unit as viewed from obliquely upward.
Figure 4:
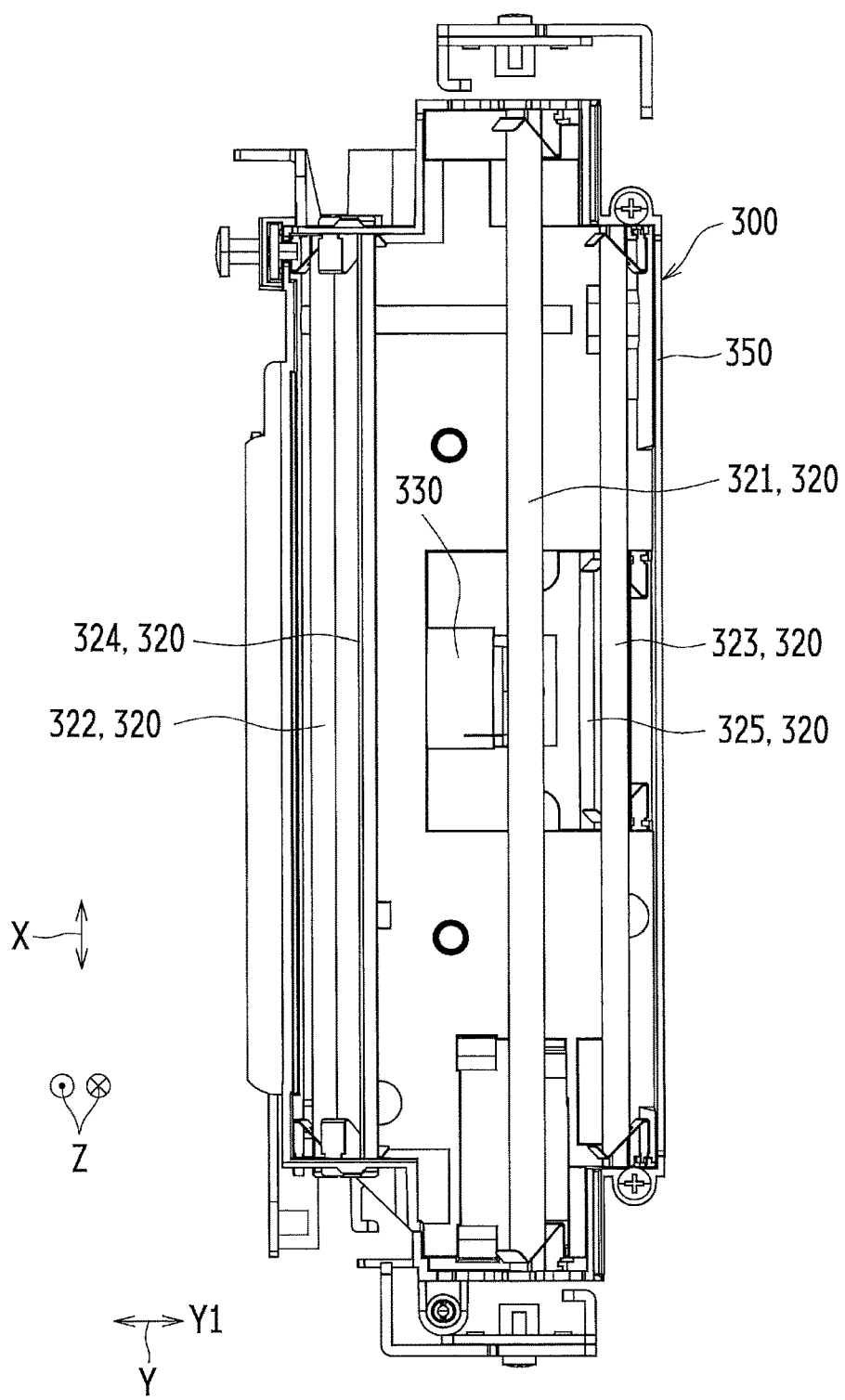
FIG. 4 is a plan view of the image reader without the light source unit as viewed from above.
Figure 5:
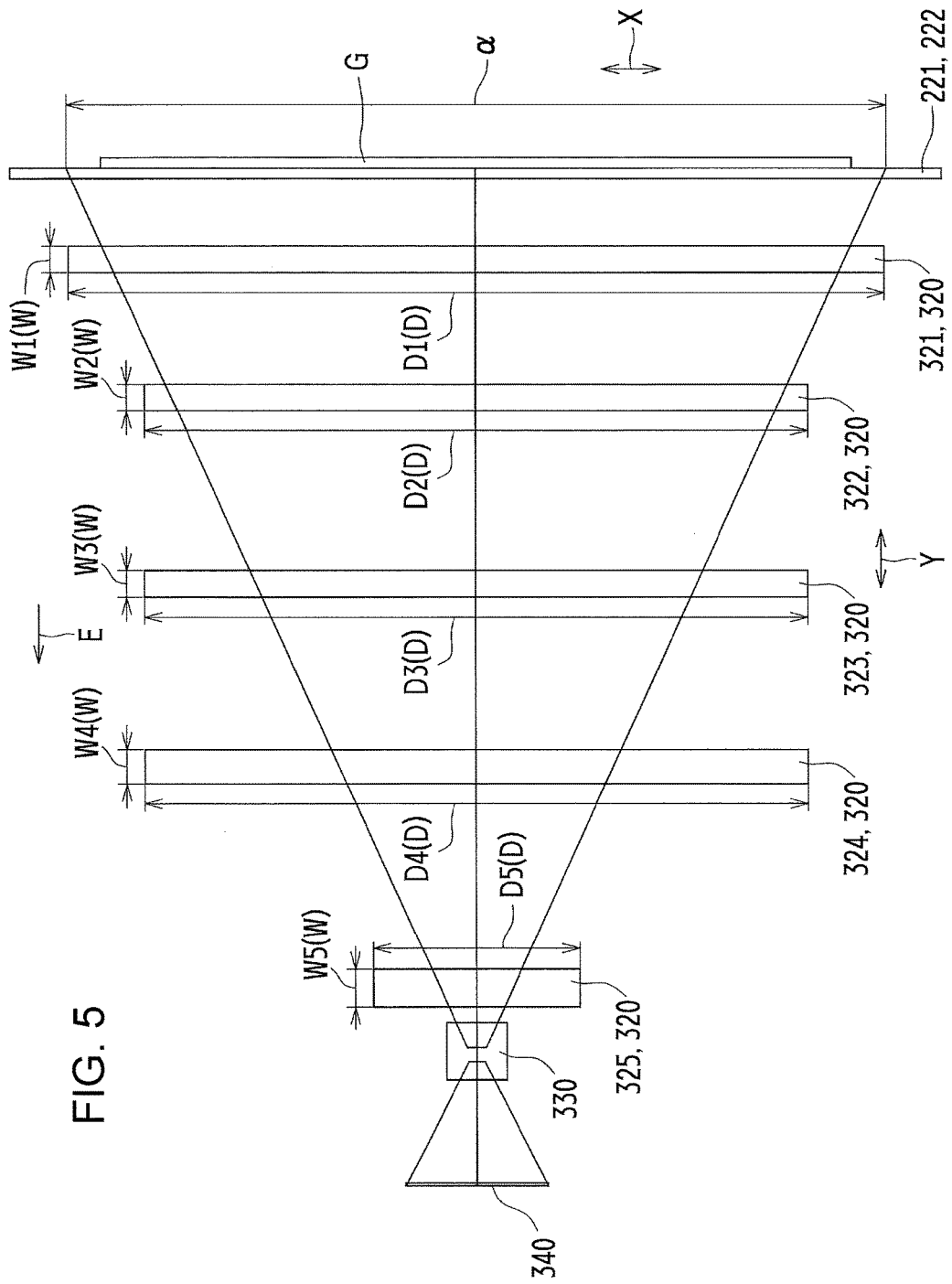
FIG. 5 is a schematic view of a reduction-type optical system in the image reading device.

FIG. 2 is a schematic front sectional view of the image reader 300 included in the image reading device 200. FIG. 3 is a front perspective view of the image reader 300 without a light source unit 310 as viewed from obliquely upward. FIG. 4 is a plan view of the image reader 300 without the light source unit 310 as viewed from above. FIG. 5 is a schematic view of a reduction-type optical system in the image reading device 200. In FIG. 5, first through fifth mirrors 321 through 325 with the mirror surfaces facing upward are shown. In FIG. 5, α indicates the reading effective width.

In the image reader 300, at least plural mirrors 320, a condenser lens 330, and the reduction-type image sensor 340 are provided. The image reader 300 reads an image by using the reduction-type image sensor 340 via the plural mirrors 320 and the condenser lens 330. The image reader 300 includes the light source unit 310 (see FIG. 2), the plural mirrors 320, the condenser lens 330, the reduction-type image sensor 340, and a housing 350 (an example of a scanning body).

The light source unit 310 illuminates the document G. The light source unit 310 includes a pair of light sources 311 and a pair of reflection members 312. The light sources 311 oppose the document G. The light sources 311 are disposed at different positions in the sub-scanning direction Y and are disposed on the respective reflection members 312. The reflection members 312 reflect light from the light sources 311 and apply it to the document G. The reflection members 312 are disposed on the top surface of the housing 350.

The plural mirrors 320 are constituted by the first through fifth mirrors 321 through 325 in this example. Reflected light L from the document G is sequentially reflected by the first through fifth mirrors 321 through 325 and the light reflected by the fifth mirror 325 is guided to the condenser lens 330.

In the housing 350, concerning the positional relationships among the plural mirrors 320 as viewed from the main scanning direction. X, the plural mirrors 320 are disposed on two sides S1 and S2 with respect to an imaginary line Q extending along the optical axis of the reflected light L from the document G. More specifically, concerning the positional relationships among the plural mirrors 320 (first through fifth mirrors 321 through 325) as viewed from the main scanning direction X, the mirrors (second through fifth mirrors 322 through 325) other than the first mirror 321 which reflects the reflected light L from the document P are disposed on the two sides S1 and S2 in the following manner. Among the mirrors (second through fifth mirrors 322 through 325), the mirrors disposed on the side S1 and those disposed on the side S2 with respect to the imaginary line Q are the same number or substantially the same number. For example, if the number of mirrors (second through fifth mirrors 322 through 325) other than the first mirror 321 is an odd number, one more mirror can be disposed on one of the two sides S1 and S2.

The condenser lens 330 concentrates and condenses the reflected light L from the fifth mirror 325 to the reduction-type image sensor 340. The reduction-type image sensor 340 converts the reflected light L from the condenser lens 330 into an electric signal. As the reduction-type image sensor 340, a sensor including an imaging element, such as a charge-coupled device (COD) or a complementary metal-oxide semiconductor (CMOS), may be used.

Concerning the positional relationships among the plural mirrors 320 as viewed from the main scanning direction X, the plural mirrors on one of the sides S1 and S2 (second and fourth mirrors 322 and 324 on the side S1 in this example) are arranged in the following manner. The reflecting position of the mirror on the downstream side (fourth mirror 324 in this example) in the traveling direction E of the reflected light L is positioned closer to the document G and also to the imaginary line Q than the mirror on the upstream side (second mirror 322 in this example). This makes it possible to arrange the mirrors (second through fifth mirrors 322 through 325) other than the first mirror 321 in a well-balanced manner. With this arrangement, the size of the image reader 300 can be reduced, which also makes the image reading device 200 smaller. Additionally, the phenomenon where the reflected light L is blocked by the condenser lens 300 (vignetting) can effectively be prevented. To put it more precisely, the first through fifth mirrors 321 through. 325 can be arranged in a well-balanced manner. It is thus possible to reduce the size of the image reader 300 using five mirrors.

The mirrors on the other side (third and fifth mirrors 323 and 325 on the side S2 in this example) are arranged such that the reflecting positions of the mirrors are aligned or substantially aligned in parallel with the imaginary line Q. This makes it possible to arrange the mirrors 320 (first through fifth mirrors 321 through 325) in an even better-balanced manner. The size of the image reader 300 can further be reduced.

First Embodiment

In the reduction-type optical system, as shown in FIG. 5, the width in the main scanning direction X of the reflected light L from the document G becomes narrower as the reflected light. L is separated farther from the document G. It is thus possible to make the lengths D1 through D5 (D) in the main scanning direction X of the plural mirrors 320 (first through fifth mirrors 321 through 325) shorter as the mirror is separated farther from the document G. However, when the housing 350 of the image reader 300 is formed with a mold, the following problem arises if, concerning the positional relationships among the mirrors as viewed from the main scanning direction X, the mirrors (fourth and third mirrors 324 and 323) closer to the document G overlap the mirrors (second and fifth mirrors 322 and 325) separated from the document G in the sub-scanning direction Y, as shown in FIG. 2. If the lengths D4 and D3 (D) in the main scanning direction X of the mirrors (fourth and third mirrors 324 and 323) closer to the document G are shorter than the lengths D2 and D5 (D) in the main scanning direction X of the mirrors (second and fifth mirrors 322 and 325) separated from the document G, undercuts are formed in the housing 350 and a certain undercut process may be required when forming the housing 350 with a mold.

In the present embodiment, among the plural mirrors 320 (first through fifth mirrors 321 through 325), the second through fourth mirrors 322 through 324 other than the first mirror 321 positioned on the most upstream side (closest to the document G) in the traveling direction E of the reflected light L and the fifth mirror 325 positioned on the most downstream side (closest to the condenser lens 330) have the same length in the main scanning direction X (see FIG. 5). This avoids the formation of undercuts in the housing 350. Additionally, the same mirror can be used for the mirrors other than the first and fifth mirrors 321 and 325. In the first embodiment, concerning he positional relationship between the fourth mirror 324 and the second mirror 322 as viewed from the main scanning direction X, the fourth mirror 324 closer to the document G overlaps the second mirror 322 separated from the document G in the sub-scanning direction Y. However, the lengths D2 and D4 of the second and fourth mirrors 322 and 324 in the main scanning direction X are equal to each other. Likewise, concerning the positional relationship between the third mirror 323 and the fifth mirror 325 as viewed from the main scanning direction X, the third mirror 323 overlaps the fifth mirror in the sub-scanning direction Y. However, the length D3 of the third mirror 323 in the main scanning direction X is longer than the length D5 of the fifth mirror 325 in the main scanning direction X. Additionally, concerning the positional relationships among the plural mirrors 320 as viewed from the main scanning direction X, the first mirror 321 does not overlap any of the second through fifth mirrors 322 through 325 in the sub-scanning direction Y. With the above-described positional relationships among the mirrors 320, undercuts are not formed in the housing 350.

In the first, embodiment, the lengths D1 through D5 (D) of the first through fifth mirrors 321 through 325 in the main scanning direction X are about 215 mm, 175 mm, 175 mm, 175 mm, 54.6 mm, respectively. The thicknesses of the first through fifth mirrors 321 through 325 are all about 3.8 mm.

Second Embodiment

In the reduction-type optical system, as shown in FIG. 2, the width of the reflected light L from the document G in the direction perpendicular to the longitudinal direction becomes wider as the reflected light L is farther separated from the document G. In the present embodiment, among the second through fourth mirrors 322 through 324 having the same length D2 through D4 in the main scanning direction X, the width W4 (W) of the fourth mirror 324 on the most downstream side (closest to the condenser lens 330) in the traveling direction E of the reflected light L is greater than the widths W2 and W3 (W) of the second and third mirrors 322 and 323 (see FIG. 5). It is thus possible to handle the reflected light G which becomes wider as it is separated farther from the document G.

In the second embodiment, the widths W1 through W5 (W) of the first through fifth mirrors 321 through 325 are about 7 mm, 7 mm, 7 mm, 9 mm, and 10 mm, respectively. The same mirror can be used for the second and third mirrors 322 and 323.

Third Embodiment

In the present embodiment, concerning the positional relationships among the mirrors and the reduction-type image sensor 340 as viewed from the main scanning direction X, the second and fourth mirrors 322 and 324 located on the side S1 and the reduction-type image sensor 340 are disposed on the upstream side in the image reading direction Y1 of the sub-scanning direction Y with respect to the imaginary line Q. With this configuration, fewer components (parts) can be disposed on the downstream side (side S2) in the image reading direction Y1 with respect to the imaginary line Q. This can reduce the size of the housing 350 in the sub-scanning direction Y on the downstream side (side S2). This can also reduce the size of the image reading device 200 in the image reading direction Y1 without decreasing the moving region of the image reader 300 in the sub-scanning direction Y.

Fourth Embodiment

In the present embodiment, concerning the positional relationship between the second and fourth mirrors 322 and 324 and the condenser lens 330 as viewed from the main scanning direction X, the second and fourth mirrors 322 and 324 disposed on the side S1 do not covering the condenser lens 330 in the sub-scanning direction Y. Hence, the plural mirrors 320 (first through fifth mirrors 321 through 325) can be arranged in an even better-balanced manner, thereby making it possible to further reduce the size of the image reader 300.

Other Embodiments

In the present embodiment, five mirrors are used. However, more than or fewer than five mirrors may be used.

The present disclosure contains subject matter related to that disclosed in Japanese Priorty Patent Application JP 2017-253607 filed in the Japan. Patent Office on Dec. 28, 2017, the entire contents of which are hereby incorporated by reference.

The present disclosure is not restricted to the above-described embodiments and may be embodied in other forms. The embodiments are therefore to be considered in all respects as illustrative and not restrictive. It should be understood by those skilled in the art that various modifications, combinations, sub-combinations and alterations may occur depending on design requirements and other factors insofar as they are within the scope of the appended claims or the equivalents thereof. The scope of the disclosure is indicated by the appended claims and all changes which come within the meaning and range of equivalency of the claims are intended to be embraced therein.

What is claimed is:

1. An image reading device comprising:
   an image reader that scans a document so as to read an image of the document,
   the image reader including
   a scanning body in which at least a plurality of mirrors, a condenser lens, and an image sensor are disposed, wherein
   the scanning body, concerning positional relationships among the plurality of mirrors as viewed from a main scanning direction, the plurality of mirrors are disposed on two sides with respect to an imaginary line extending along an optical axis of reflected light from the document, and
   a plurality of the mirrors on a corresponding one of the two sides are disposed such that a reflecting position of a mirror on a downstream side in a traveling direction of the reflected light is positioned closer to the document and also to the imaginary line than a reflecting position of a mirror on an upstream side in the traveling direction of the reflected light.

2. The image reading device according to claim 1, wherein, among the plurality of mirrors, the mirrors other than a mirror positioned on the most upstream side in the traveling direction of the reflected light and a mirror positioned on the most downstream side have the same length in the main scanning direction.

3. The image reading device according to claim 2, wherein, among the mirrors having the same length in the main scanning direction, concerning widths of the mirrors in a direction perpendicular to a longitudinal direction of the mirrors, the width of a mirror positioned on the most downstream side in the traveling direction of the reflected light is greater than the widths of the other mirrors.

4. The image reading device according to claim 1, wherein, concerning positional relationships among the mirrors and the image sensor as viewed from the main scanning direction, the mirrors positioned on the corresponding one of the two sides and the image sensor are disposed on the upstream side in an image reading direction of a sub-scanning direction with respect to the imaginary line, the image reading direction being a direction in which the image of the document is read.

5. The image reading device according to claim 1, wherein, concerning positional relationships among the mirrors as viewed from the main scanning direction, the mirrors positioned on the corresponding one of the two sides do not overlap the condenser lens in a sub-scanning direction.

6. The image reading device according to claim 1, wherein:
   the plurality of mirrors are constituted by first through fifth mirrors, and the reflected light from the document is sequentially reflected by the first through fifth mirrors and light reflected by the fifth mirror is guided to the condenser lens; and
   the mirrors positioned on the corresponding one of the two sides are the second and fourth mirrors, and mirrors positioned on the other one of the two sides are the third and fifth mirrors.

7. An image forming apparatus comprising:
   the image reading device according to claim 1.

* * * * *